(12) United States Patent
Meid et al.

(10) Patent No.: US 11,679,747 B2
(45) Date of Patent: Jun. 20, 2023

(54) HYDRAULIC SYSTEM, VEHICLE AND COMPOSITE VEHICLE

(71) Applicant: DEERE & COMPANY, Moline, IL (US)

(72) Inventors: Michael Meid, Waghaeusel (DE); Sebastian Traut, Langenfeld (DE); Manuel Billich, Dischingen (DE); Mathias Klittich, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 527 days.

(21) Appl. No.: 16/865,710

(22) Filed: May 4, 2020

(65) Prior Publication Data
US 2020/0361435 A1    Nov. 19, 2020

(30) Foreign Application Priority Data

May 14, 2019   (DE) .......................... 102019206982.7

(51) Int. Cl.
| | |
|---|---|
| *B60T 13/58* | (2006.01) |
| *B60T 1/06* | (2006.01) |
| *B60T 1/08* | (2006.01) |
| *B62D 49/06* | (2006.01) |
| *B62D 53/00* | (2006.01) |
| *F15B 13/02* | (2006.01) |
| *F15B 21/08* | (2006.01) |

(52) U.S. Cl.
CPC ............ *B60T 13/585* (2013.01); *B60T 1/065* (2013.01); *B60T 1/08* (2013.01); *B62D 49/0671* (2013.01); *B62D 53/00* (2013.01); *F15B 13/025* (2013.01); *F15B 21/08* (2013.01)

(58) Field of Classification Search
None
See application file for complete search history.

(56) References Cited

U.S. PATENT DOCUMENTS

| | | | |
|---|---|---|---|
| 3,118,708 A | 1/1964 | Gold et al. | |
| 4,293,164 A | 10/1981 | Hoefer et al. | |
| 2008/0298977 A1 | 12/2008 | Juricak et al. | |
| 2016/0200200 A1* | 7/2016 | Nakata | B60L 15/2009 303/3 |
| 2017/0240147 A1* | 8/2017 | Kotera | F16D 65/22 |

FOREIGN PATENT DOCUMENTS

| | | | | |
|---|---|---|---|---|
| CN | 105438140 A | * | 3/2016 | ................ B60T 1/10 |
| DE | 102012112381 A1 | | 6/2014 | |
| EP | 2328785 A1 | | 6/2011 | |

OTHER PUBLICATIONS

European Search Report issued in counterpart application No. 20174049.5 dated Sep. 7, 2020 (08 pages).

* cited by examiner

*Primary Examiner* — Melanie Torres Williams

(57) ABSTRACT

A hydraulic system of a vehicle includes a hydraulic pump with variable delivery capacity. The hydraulic pump is controllable as a function of a load and operatively connected to a drive of the vehicle. The system includes a first brake system for reducing a speed of the vehicle by at least one friction brake, and a permanent brake system being independent of the first brake system and configured to reduce the speed of the vehicle. The permanent brake system includes a first retarder circuit which cooperates with the hydraulic pump such that kinetic energy is removed from the vehicle by the permanent brake system via the hydraulic pump in order to decelerate the vehicle.

20 Claims, 8 Drawing Sheets

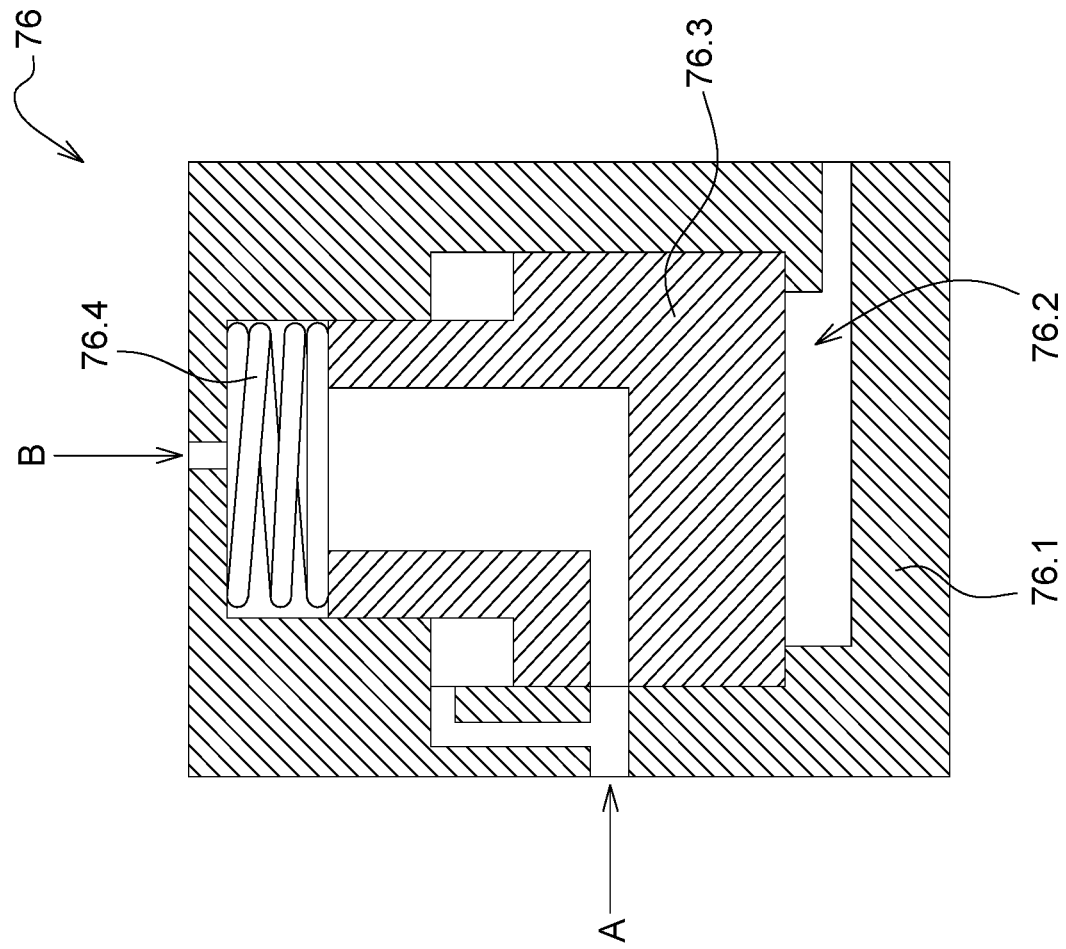
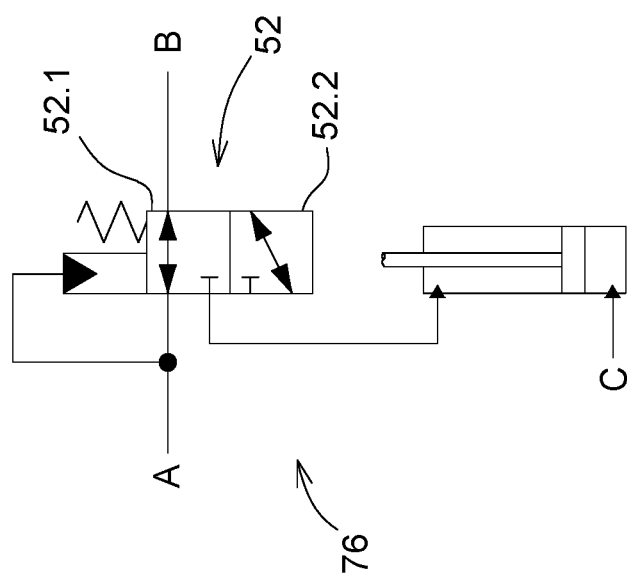
FIG. 5A
FIG. 5B

HYDRAULIC SYSTEM, VEHICLE AND COMPOSITE VEHICLE

RELATED APPLICATIONS

This application claims priority to German Patent Application Ser. No. 102019206982.7, filed May 14, 2019, the disclosure of which is hereby incorporated by reference in its entirety.

FIELD OF THE DISCLOSURE

The present disclosure relates to a hydraulic system of an agricultural or industrial vehicle, and in particular to a vehicle having at least one controllable hydraulic pump with variable delivery capacity.

BACKGROUND

When heavy vehicles brake such as when traveling downhill over long distances, high levels of energy have to be converted. In such cases it may arise that the cooling performance of a conventional brake system which generally comprises friction brakes, for example, in the manner of brake disks, is insufficient. Moreover, wear may be produced on the brake system or the friction brake(s) of the brake system, which may reduce the service life thereof.

It is known to use an engine brake to reduce the speed of a vehicle. However, this may be limited in terms of performance or not permit optimal control of the braking action. Moreover, in a conventional engine brake the trailer brake is not activated, which may lead to difficult driving situations. If, in the case of permanent braking on a composite vehicle, a trailer device is not decelerated or decelerated too little, it may lead to so-called "jack knifing" or folding up of the composite vehicle.

Thus, there is a need to provide a hydraulic system, a vehicle and a composite vehicle by which the aforementioned drawbacks are remedied.

SUMMARY

In the present disclosure, a hydraulic system of an agricultural or industrial vehicle includes at least one hydraulic pump with variable delivery capacity which is controllable, in particular, as a function of the load and which may be operatively connected by a mechanical device to a drive of the vehicle, at least one first brake system for reducing the speed of the vehicle by at least one friction brake, and a permanent brake system which in addition to or independently of the first brake system may reduce the speed of the vehicle. The permanent brake system in turn comprises at least one first retarder circuit which may cooperate with the hydraulic pump such that kinetic energy is removed from the vehicle by the permanent brake system via the hydraulic pump in order to effect a deceleration of the vehicle. In this manner, the vehicle may be decelerated by using a hydraulic pump which is already located on the vehicle for other purposes. This may reduce the number of components or the complexity of the system and is cost-effective. The hydraulic pump may be provided, for example, in order to supply hydraulic fluid to a brake system or steering system, a sub-assembly or sub-assemblies of the vehicle, or one or more attachments, or to apply hydraulic pressure thereto.

If the first retarder circuit comprises a mechanism for reducing the kinetic energy or a conversion of the kinetic energy into heat, another device may be provided in order to dissipate energy from the hydraulic system, in particular heat which has been absorbed in the hydraulic fluid. These devices, in particular, may be configured in the manner of a cooler, wherein the cooler may be a specific cooling apparatus for the permanent brake system or a cooling apparatus of the vehicle which is already present for other purposes.

The device in this case may be configured in the manner of at least one pressure limiting valve or at least one load orifice, or comprise at least one such pressure limiting valve/load orifice. By a proportional valve connected upstream or one or more switching valve(s) connected upstream, the quantity of hydraulic fluid removed by the permanent brake system may also be determined.

It is particularly simple if the hydraulic pump is connected to the drive via a gear input shaft.

At least one braking mechanism is provided, at least the first brake system or the permanent brake system being able to be actuated thereby. The braking mechanism may be, for example, a brake pedal of the vehicle. However, it is also conceivable, in particular for actuating the permanent brake system, to provide a manually actuatable braking mechanism, in particular in the manner of a brake lever or a switch so that an operator does not have to hold the braking mechanism permanently actuated in order to decelerate the vehicle.

A control unit may be provided such that the permanent brake system is able to be controlled, such as by being activated or deactivated, thereby or the deceleration effected by the permanent brake system being able to be controlled thereby. This is carried out as a function of the output of a sensor which is operatively connected to the control unit, in particular a path sensor cooperating with the braking mechanism. If the braking mechanism comprises a brake pedal or is designed as such, in this case the control unit may evaluate an actuating path or pedal path of the brake pedal, which may then be interpreted as a measure of the desired deceleration. The control system cooperates with at least one proportional valve or one or more switching valve(s).

In addition to the first retarder circuit, a second retarder circuit may be provided, brake pressure being able to be applied thereby to a brake system of a trailer device when the permanent brake system is activated. In this manner, a trailer device may be braked or decelerated together with the vehicle or as a function thereof, whereby it is possible to counteract "jack knifing" or folding up of a composite vehicle, consisting of the vehicle and trailer device.

It is particularly advantageous if a system separation valve is provided between the second retarder circuit and the brake system of the trailer device, so that no oil exchange takes place between the retarder circuit and the brake system or no foamed hydraulic fluid may pass out of the retarder circuit into the braking circuit. In this manner, the air component in the oil may be kept small.

If a vehicle having a drive, in particular an internal combustion engine, and at least one hydraulic pump is provided with a hydraulic system for supplying at least one sub-assembly of the vehicle with hydraulic pressure, wherein the hydraulic pump is operatively connected by a mechanical device to the drive, a hydraulic pump which is already present may be used in order to implement braking without wear. Thus a further or separate device for producing permanent braking may be dispensed with, which is cost-effective and simple.

The vehicle, in particular, is an agricultural or industrial working vehicle, such as in the manner of an agricultural tractor or tractor. The vehicle, however, may also be an agricultural harvesting machine, a self-propelled sprayer, a construction vehicle, an industrial transport/tractive vehicle or any other suitable vehicle with a hydraulic pump for supplying hydraulic fluid to a sub-assembly or an attachment of the vehicle.

A composite vehicle having a vehicle as described above and at least one trailer device makes it possible to brake the trailer device together with or as a function of the vehicle in order to counteract "jack knifing" or folding up of the composite vehicle. The trailer device may be, for example, a transport trailer, a loader, an agricultural device such as a harvesting device, a baler, a haymaking device, or any other agricultural device such as a towed sprayer, a seeder, or the like.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 5a shows a symbolic illustration of the connecting options of a system separation valve according to the second embodiment;

FIG. 5b shows a simplified sectional view of the system separation valve according to FIG. 5a;

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
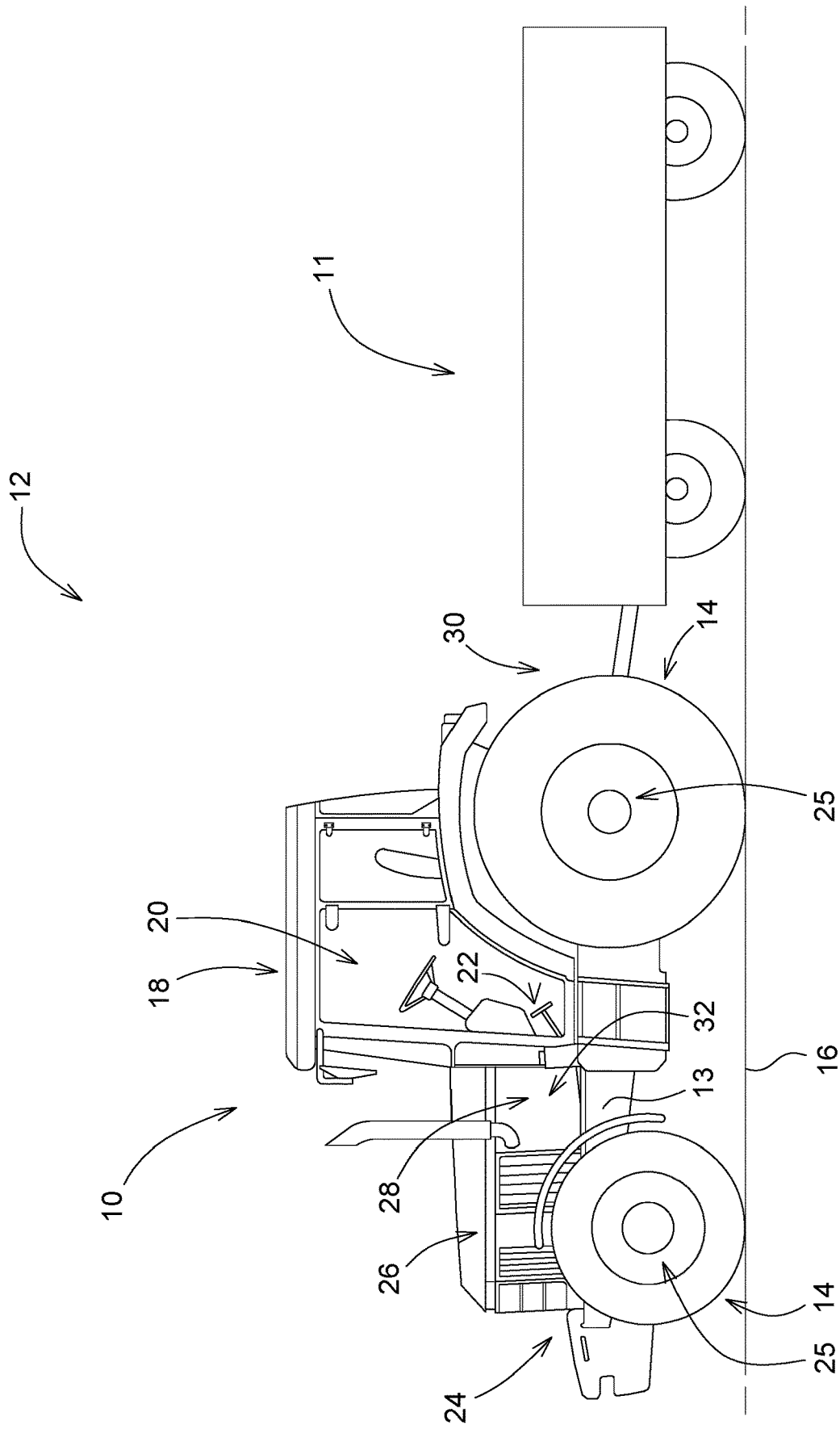
FIG. 1 shows a side view of an agricultural vehicle having a hydraulic system.

FIG. 1 of the present disclosure shows an agricultural vehicle 10, in the manner of an agricultural tractor or tractor, which together with a trailer device 11 forms a composite vehicle 12. The vehicle 10 has a frame 13 which is supported via front and rear wheels 14 on the ground 16. An operator workstation 20 is arranged in a cab 18. A brake pedal is provided in the operator workstation 20, the brake pedal being denoted hereinafter as the braking device 22 and acting on a service brake or a brake system 24 of the vehicle 10. The brake system 24 is configured in a known manner, and the vehicle may be decelerated by friction brakes 25, in particular in the manner of disk brakes, as a function of a position of the braking device 22. The vehicle 10 also has a drive 26, only shown by way of indication, and a gear unit 28 which is also only indicated. Both the drive 26 and the gear unit 28 may be designed in the known manner. In particular, the drive 26 is configured as an internal combustion engine.

The trailer device 11, which is designed in the manner of a conventional transport trailer, is coupled to a coupling apparatus 30 of the vehicle 10. This trailer device 11 is optionally provided. In this case, it may be any suitable trailer device 11, for example a loader, an agricultural harvesting device, for example a baler, a haymaking device, or any other, in particular agricultural, device. Moreover, a hydraulic system 32 is provided on the vehicle 10.

Figure 2:
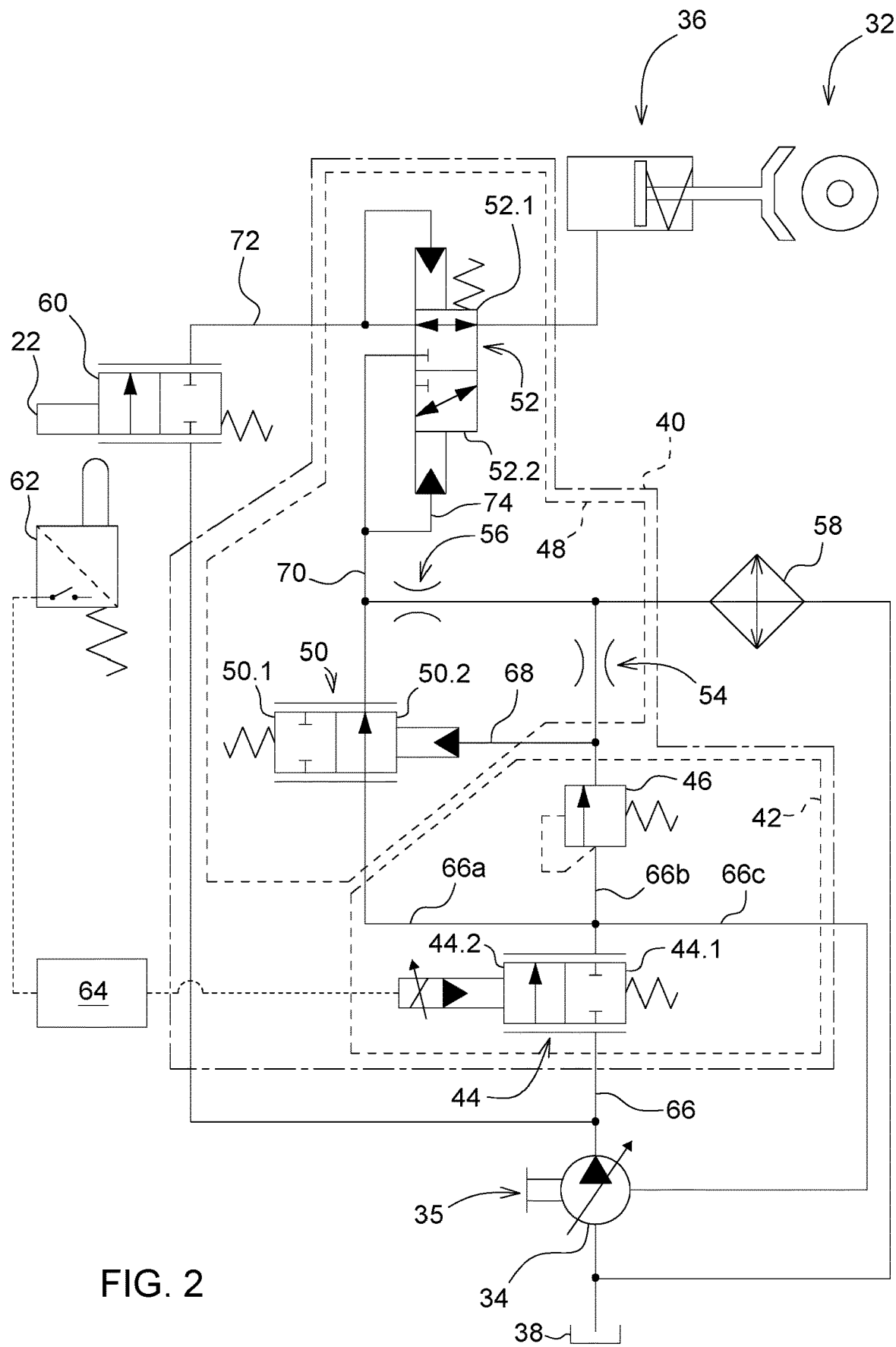
FIG. 2 shows a simplified view of a first embodiment of the hydraulic system according to FIG. 1.

Reference is now made to FIG. 2 in which the hydraulic system 32 of the vehicle 10 is shown in a simplified manner. A hydraulic pump 34 is operatively connected by a mechanical mechanism to the drive 26 or the gear unit 28, generally via a gear input shaft 35, only shown by way of indication. The hydraulic pump 34 is provided in order to drive one or more sub-assemblies (not shown) of the vehicle 10 or to supply hydraulic fluid thereto. The sub-assemblies may, for example, be the brake system 24 of the vehicle 10, a steering system (not shown), a lifting device or other suitable sub-assemblies. The hydraulic pump 34, however, may also optionally supply the trailer device 11 with hydraulic fluid. In particular, the hydraulic pump 34 may provide hydraulic fluid for a braking device 36 of the trailer device 11 which cooperates with the brake system 24. The hydraulic pump 34 is configured as a known hydraulic pump with variable delivery volume, which may be controlled as a function of a load pressure and which draws hydraulic fluid from a hydraulic fluid reservoir 38 of the vehicle 10.

Moreover, a retarder or permanent brake system 40 is provided, the retarder or permanent brake system being able to be used, for example, initially or before or in addition to the brake system 24, in particular in the case of challenging braking situations, for example, in the case of downhill travel (of lengthy duration).

The permanent brake system 40 has a vehicle retarder circuit which is denoted hereinafter as the first retarder circuit 42, with a proportional valve 44 which is spring-loaded in the direction of its closed position 44.1 and a pressure-limiting valve 46, and a trailer retarder circuit which is denoted hereinafter as the second retarder circuit 48 for the optional trailer device 11, with a control valve 50 which is spring-loaded in the direction of its closed position 50.1, a changeover valve 52, a measuring orifice 54 and a relief orifice 56. Also provided are a cooling apparatus, which is denoted hereinafter in short as the cooler 58, for cooling the hydraulic fluid, as well as a brake valve 60, which may be actuated by the braking device 22, and a path sensor 62, for determining the position of the braking device 22. The path sensor 62 cooperates with a control unit 64 which, among other things, controls the brake system 24 of the vehicle 10. Moreover, the control unit cooperates with the permanent brake system 40 and controls the proportional valve 44 as a function of a position of the path sensor 62. As a function of the position of the path sensor 62, the control unit 64 may move the proportional valve 44 out of its closed position 44.1 into a position 44.2 permitting a hydraulic flow.

The proportional valve 44 of the first retarder circuit 42 is provided downstream of the hydraulic pump 34 and connected thereto via a first line 66. The line 66 is divided downstream of the proportional valve 44 into a first line branch 66a which conducts hydraulic fluid to the control valve 50 of the second retarder circuit 48, and a second line branch 66*b* which conducts hydraulic fluid from the proportional valve 44 to the spring-loaded pressure limiting valve 46. A third line branch 66*c* transmits the prevailing load pressure to the hydraulic pump 34.

The measuring orifice 54 is arranged downstream of the pressure limiting valve 46, wherein upstream of the measuring orifice 54 a control line 68 of the control valve 50 branches off from the second line branch 66*b*, such that the control valve 50 may be controlled by the back pressure of the measuring orifice 54 so as to correspondingly adopt its open position 50.2. The relief orifice 56 is connected downstream of the control valve 50 in the direction of the hydraulic fluid reservoir 38 for controlling the correct brake pressure and for reducing the brake pressure. Hydraulic fluid may be passed back into the hydraulic fluid reservoir 38 via the cooler 58.

A further hydraulic line 70 conducts hydraulic fluid from the control valve 50 to the changeover valve 52 in order to apply brake pressure thereto. The changeover valve 52 has a first position 52.1 in which it is able to supply the braking apparatus 36 of the trailer device 11 via the hydraulic line 70 with hydraulic fluid and apply brake pressure thereto, and a second pretensioned position 52.2 in which it is able to supply the braking apparatus 36 with hydraulic fluid via the brake valve 60, shown simplified, directly via an independent brake line 72 of the brake system 24 upstream of the permanent brake system 40.

The changeover valve 52 adopts its first position 52.1 when a sufficiently high brake pressure prevails in the hydraulic line 70 and thus in a control line 74 of the changeover valve 52. If the pressure prevailing in the control line 74 is not sufficiently high or if the braking device 22 is actuated sharply by an operator, such that the changeover valve 52 adopts its second position 52.2, the hydraulic pump 34 is connected to the braking apparatus 36 of the trailer device 11 via the braking device 22 or the brake valve 60. The changeover valve 52 in this case is designed such that the brake system 24 is always able to override the pressure prevailing in the permanent brake system 40.

The function of the permanent brake system 40 is now intended to be described in more detail hereinafter. If, in a braking situation, the braking device 22 is actuated by the operator, this is recorded by the path sensor 62. This path sensor transmits an output value to the control unit 64 which controls the proportional valve 44 as a function of the output value, so that the proportional valve permits a flow of hydraulic fluid corresponding to the output value of the path sensor 62. Thus, via the proportional valve 44, the braking power is adjusted as a function of the path of the braking device 22.

According to the present embodiment, the braking power of the permanent brake system 40 is converted in the pressure limiting valve 46. The delivery capacity of the hydraulic pump 34 in turn is controlled according to the load pressure prevailing in the line 66 upstream of the pressure limiting valve, whereby kinetic energy of the vehicle 10 is dissipated as a result of the mechanical connection of the hydraulic pump 34 to the drive 26. The hydraulic fluid dissipates the energy in the form of heat and according to the example shown is cooled via the cooler 58. However, it is also conceivable that the hydraulic fluid is cooled via a cooling apparatus already provided on the vehicle 10 or even additionally by such a cooling apparatus.

By the embodiment shown above, a high level of braking power may be achieved over the entire speed range of the hydraulic pump 34. The control may also be implemented in a very effective manner due to a linear power loss characteristic curve.

Figure 3:
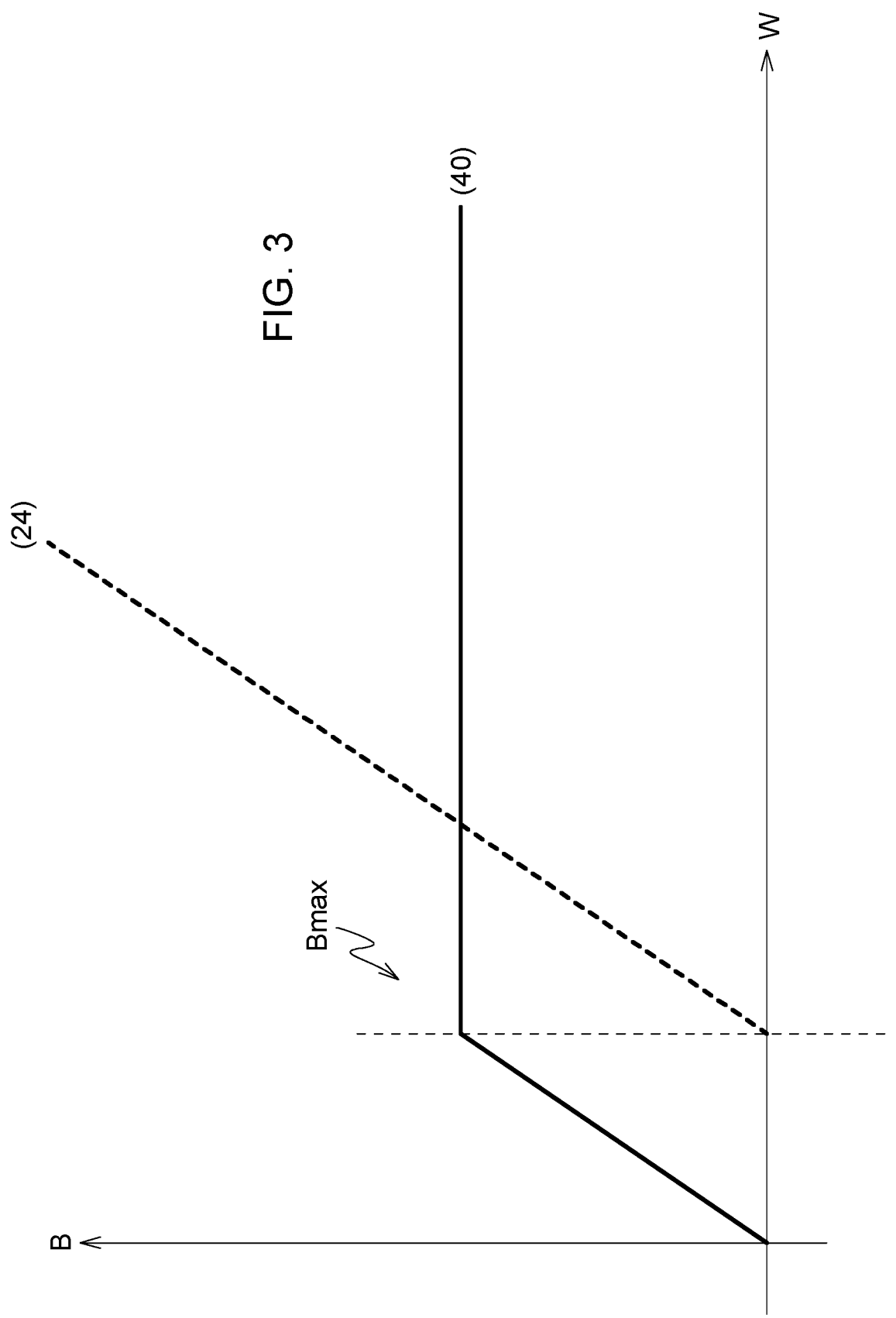
FIG. 3 shows a simplified diagram for illustrating a possible optimal activation sequence of a brake system and a permanent brake system of the vehicle.

Reference is now made to FIG. 3 which shows how an activation of the brake system 24 and the permanent brake system 40 may be carried out in a manner which is as optimal as possible. In order to achieve a braking action an operator actuates the braking device 22. The control unit 64 evaluates the pedal path W via the path sensor 62 which is present on the braking device 22. This is interpreted as a measure of the desired deceleration or braking power B. Up to the maximum possible deceleration $B_{max}$ via the permanent brake system 40, braking is exclusively carried out thereby. When the pedal path W increases further, the brake system 24 is activated.

If a trailer device 11 is coupled to the vehicle 10, it may be advantageous if a brake signal is also delivered by the permanent brake system 40 to the trailer device 11. In this manner, a simultaneous braking of the vehicle 10 and trailer device 11 may be carried out and a "jack knifing/folding-knife effect," i.e., undesired folding up of the vehicle 10 and trailer device 11, may be prevented. As described above, this takes place via the changeover valve 52 when it is located in its first position 52.1. However, if the vehicle 10 is braked additionally or exclusively via the brake system 24, the changeover valve 52 adopts its second position 52.2 in which it connects the hydraulic pump 34 to the brake system 36 of the trailer device 11 such that the hydraulic pump 34 applies brake pressure thereto.

Figure 4:
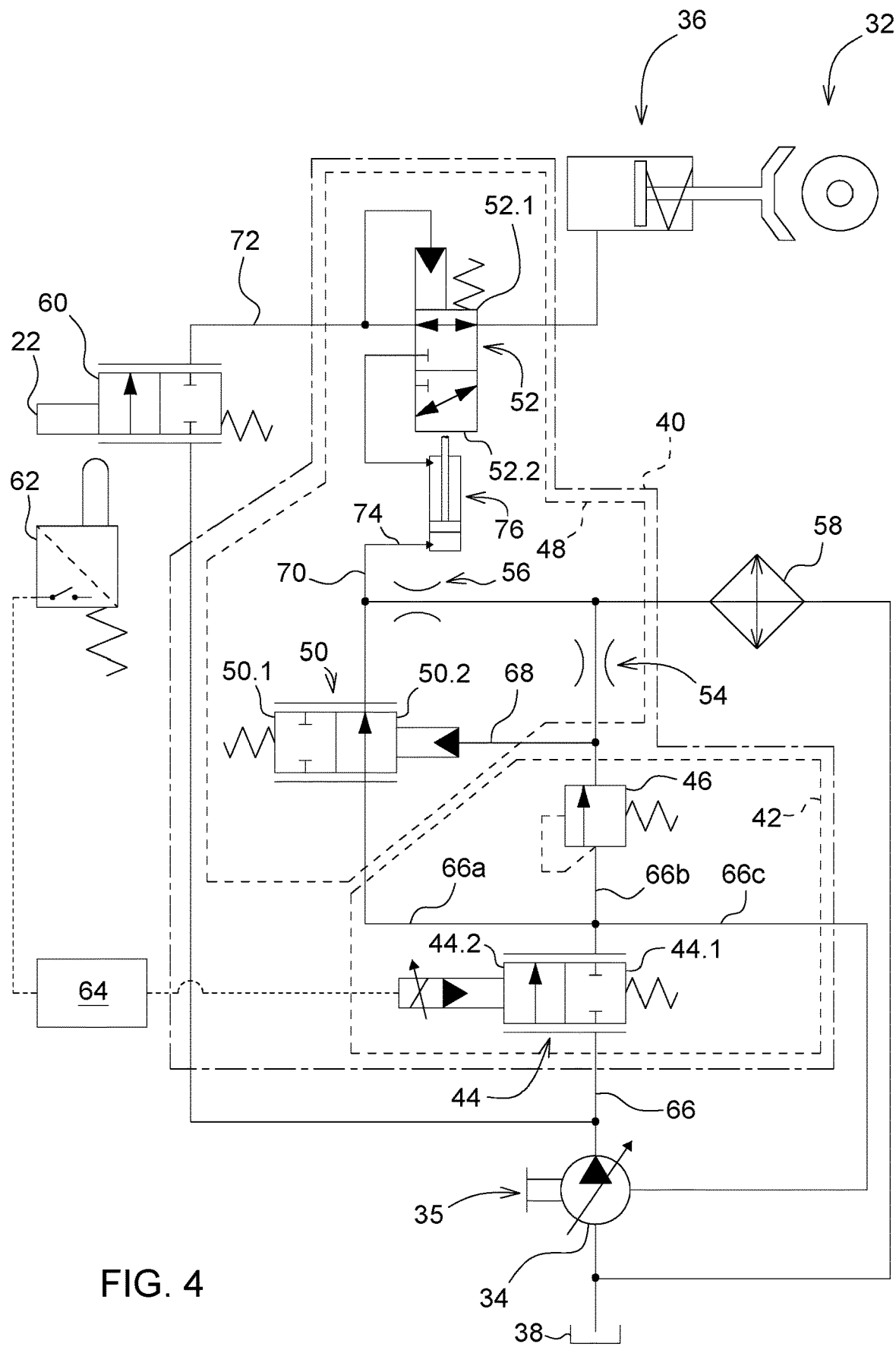
FIG. 4 shows a second embodiment of a hydraulic system according to FIG. 1.

Reference is now also made to FIG. 4 in which a second embodiment of the present disclosure is shown in which a separation is provided between the brake system 36 of the trailer device 11 and the permanent brake system 40. By providing a separation, no hydraulic fluid passes out of the permanent brake system 40 into the brake system 36 of the trailer device 11, the air component in the hydraulic fluid may be kept very small or no foamed hydraulic fluid may pass out of the permanent brake system 40 into the brake system 36 of the trailer device 11 or the brake system 24 of the vehicle 10. A system separation valve 76 is provided for separating the brake systems 24, 36 and the permanent brake system 40.

Reference is now also made to FIGS. 5*a* and *b*, in which in FIG. 5*a* the connecting options of the system separation valve 76 are shown as switching symbols and in FIG. 5*b* the construction of the system separation valve 76 is illustrated more clearly using a sectional view. The system separation valve 76 has a housing 76.1 with an interior 76.2, in which a piston 76.3 is movably received counter to the action of a spring 76.4. The system separation valve 76 also has a first connection port A, a second connection port B and a third connection port C, wherein the connection port A is connected to the brake system 24 of the vehicle 10, the connection port B is connected to the brake system 36 of the trailer device 11 and the connection port C is connected via the hydraulic line 70 to the permanent brake system 40. The system separation valve may adopt a first position in which it produces, as shown in FIGS. 5*a* and *b*, a connection between the connection ports A and B, and a second position in which the piston 76.3 is displaced counter to the action of the spring 76.4 by a pressure prevailing at the connection port C, such that a connection is interrupted between the connection ports A and B, and the hydraulic fluid located in the interior 76.3 is forced via the connection port C into the brake system 36 of the trailer device 11 in order to apply brake pressure thereto.

Figure 6:
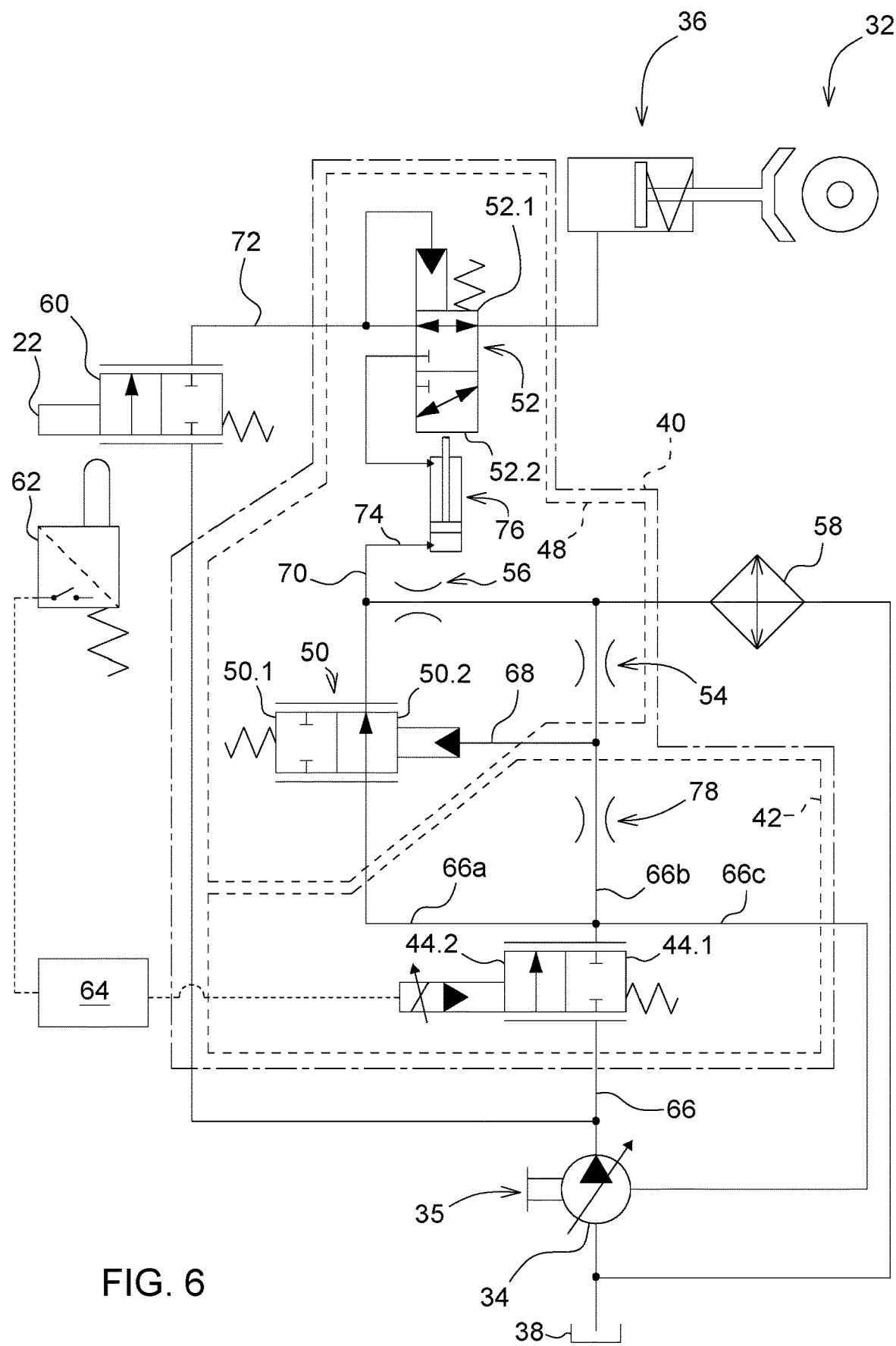
FIG. 6 shows a third embodiment of a hydraulic system according to FIG. 1.

Reference is now made to FIG. 6, in which a third embodiment of the disclosure, which substantially corresponds to the embodiment according to FIG. 4, is shown. The variant shown differs from the embodiment shown in FIG. 4 by the pressure limiting valve 46 being replaced by a load orifice 78. Such a design is more cost-effective but has a progressive characteristic, instead of a linear characteristic, whereby a reduced braking power is achieved at speeds below the design speed and a less effective controllability is provided.

Figure 7:
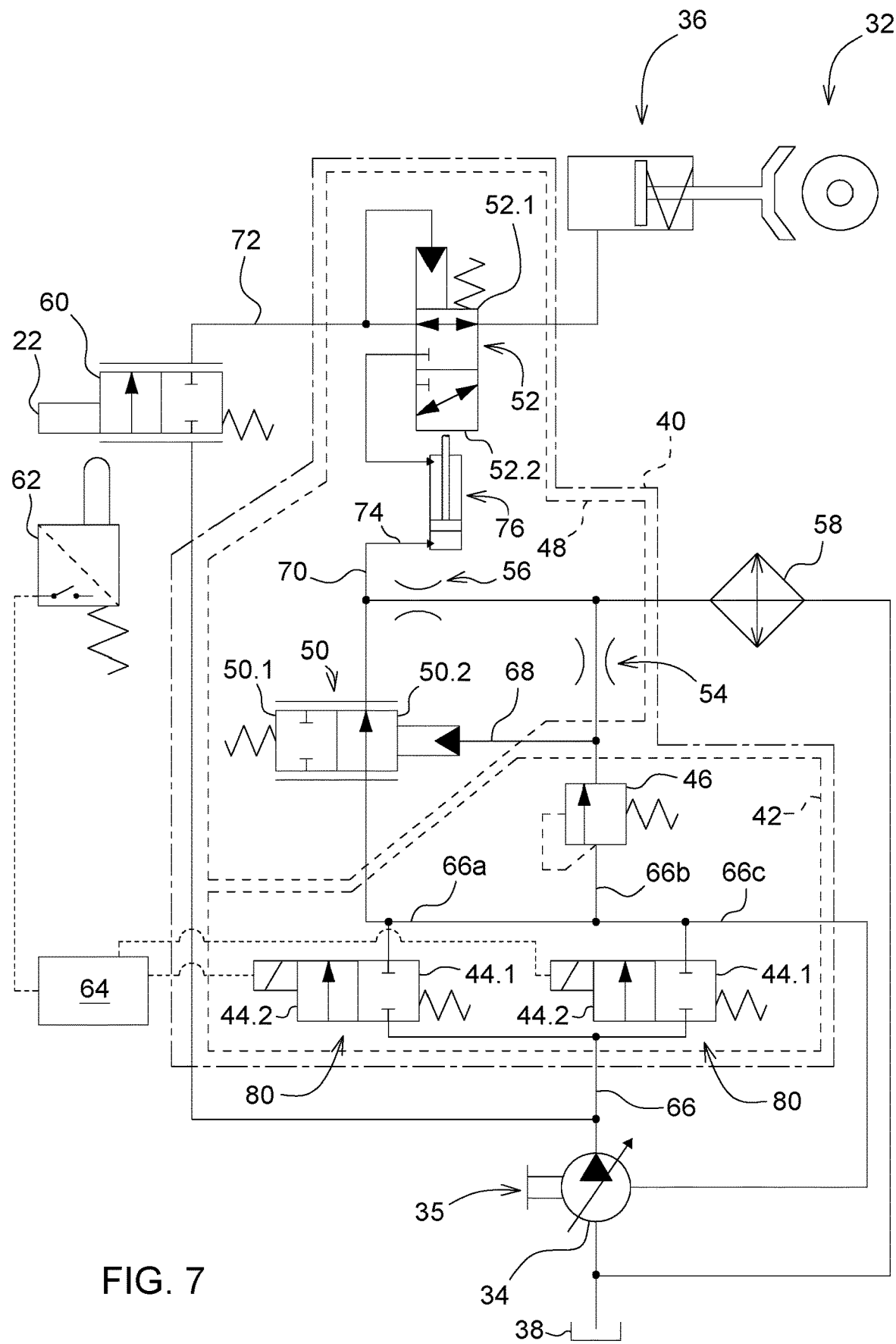
FIG. 7 shows a fourth embodiment of a hydraulic system according to FIG. 1.

The fourth embodiment shown in FIG. 7 substantially corresponds once again to the embodiment according to FIG. 4 but differs therefrom in that the proportional valve 44 is replaced by one or more switching valves 80, wherein two switching valves 80 are used in the embodiment shown. Such a design is more cost-effective but permits only a stepwise adjustment of the braking power.

Figure 8:
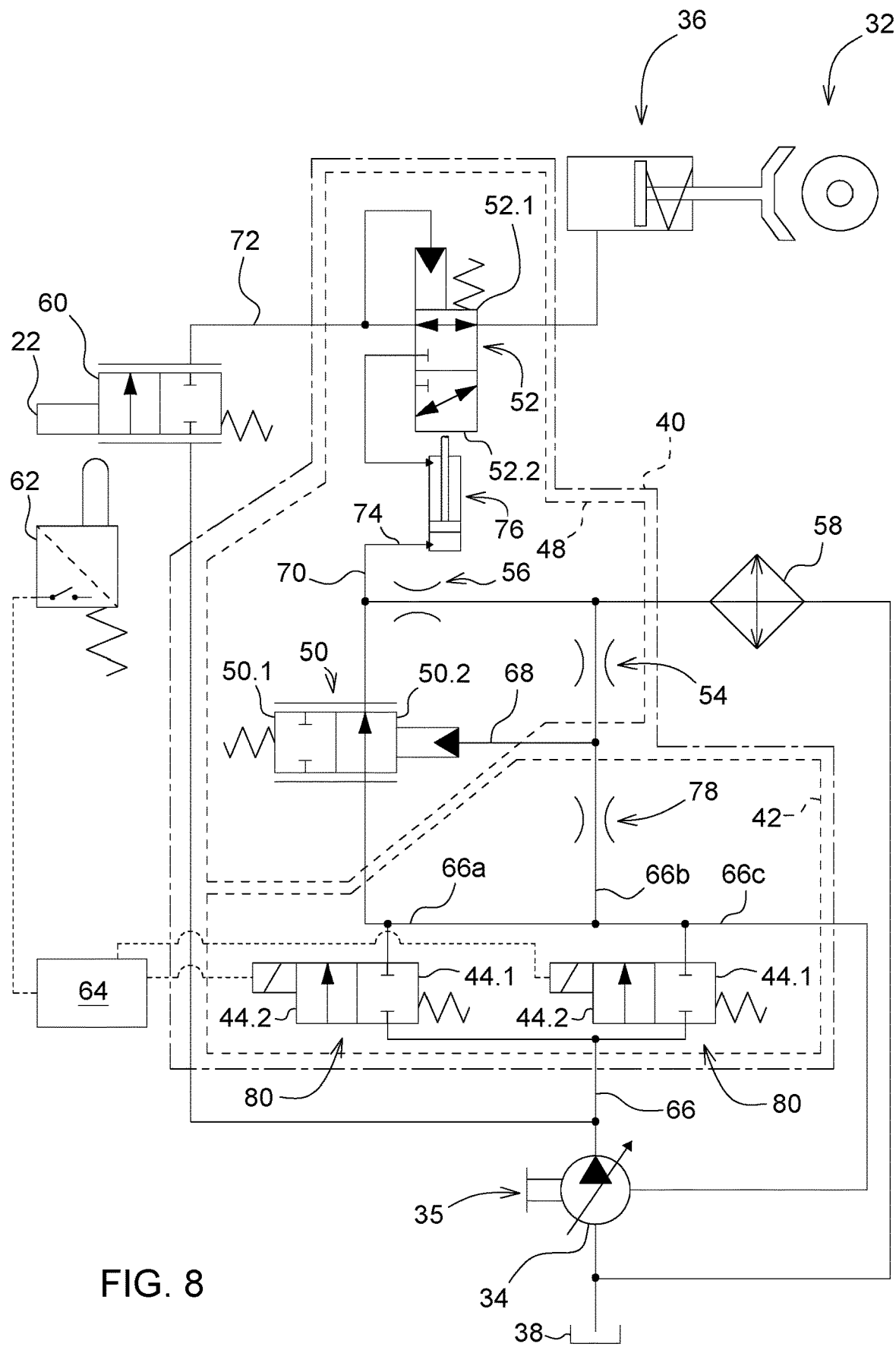
FIG. 8 shows a fifth embodiment of a hydraulic system according to FIG. 1.

The fifth embodiment shown in FIG. 8 combines the features of the embodiments according to FIGS. 6 and 7. This embodiment is the most cost-effective of the variants shown, wherein this variant provides only a stepwise and progressive braking characteristic, however.

It may also be provided that a maximum permanent braking power is assisted by a specially adapted gear control system which increases a rotational speed of the drive 26 when the permanent brake system 40 is activated. At the same time, therefore, an engine brake, which is possibly present, may additionally be used as a permanent brake.

Additionally or alternatively to the path sensor 62, it may also be provided that the permanent brake system 40 may be implemented by a specific actuating mechanism which is provided in the region of the operator workstation 20 such as, for example, a lever or a switch.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A hydraulic system of a vehicle, comprising:
a hydraulic pump with variable delivery capacity, the hydraulic pump being controllable as a function of a load and being operatively connected to a drive of the vehicle;
a first brake system for reducing a speed of the vehicle by at least one friction brake; and
a permanent brake system being independent of the first brake system, the permanent brake system configured to reduce the speed of the vehicle;
wherein the permanent brake system comprises a first retarder circuit which cooperates with the hydraulic pump such that kinetic energy is removed from the vehicle by the permanent brake system via the hydraulic pump in order to decelerate the vehicle;
wherein the permanent brake system comprises a second retarder circuit for operably applying brake pressure to a brake system of a trailer device when the permanent brake system is activated.

2. The hydraulic system of claim 1, wherein the first retarder circuit comprises a device for reducing the kinetic energy or a conversion of the kinetic energy into heat.

3. The hydraulic system of claim 2, wherein the device comprises a cooler for operably dissipating energy from the hydraulic system.

4. The hydraulic system of claim 2, wherein the device comprise at least one pressure limiting valve or at least one load orifice.

5. The hydraulic system of claim 2, wherein the device comprise a combination of a pressure limiting valve and a load orifice.

6. The hydraulic system of claim 1, wherein the hydraulic pump is connected to the drive via a gear input shaft.

7. The hydraulic system of claim 1, further comprising a braking device for actuating the first brake system or the permanent brake system.

8. The hydraulic system of claim 1, further comprising a control unit for operably controlling the permanent brake system between an activated state or a deactivated state.

9. The hydraulic system of claim 8, further comprising a sensor operatively connected to the control unit for outputting a signal thereto for controlling the permanent brake system.

10. The hydraulic system of claim 9, wherein the sensor comprises a path sensor operably cooperating with the braking device.

11. The hydraulic system of claim 8, wherein the deceleration of the vehicle is effected by the permanent brake system being operably controlled by the control unit.

12. The hydraulic system of claim 8, wherein the control unit operably cooperates with a proportional valve or a switching valve.

13. The hydraulic system of claim 1, further comprising a system separation valve provided between the second retarder circuit and the brake system of the trailer device.

14. A vehicle, comprising:
a frame;
a plurality of wheels for supporting the frame;
a cab including an operator workstation;
a drive;
a hydraulic system including a hydraulic pump for supplying at least one sub-assembly of the vehicle with hydraulic pressure, wherein the hydraulic pump is operatively connected to the drive;
a first brake system for reducing a speed of the vehicle by at least one friction brake; and
a permanent brake system configured to reduce the speed of the vehicle, the permanent brake system comprising a first retarder circuit which cooperates with the hydraulic pump such that kinetic energy is removed from the vehicle by the permanent brake system via the hydraulic pump in order to decelerate the vehicle, and the permanent brake system comprising a second retarder circuit for operably applying brake pressure to a brake system of a trailer device when the permanent brake system is activated.

15. The vehicle of claim 14, further comprising a braking device located in the operator workstation for actuating the first brake system or the permanent brake system.

16. The vehicle of claim 14, further comprising a control unit for operably controlling the permanent brake system between an activated state or a deactivated state.

17. The vehicle of claim 14, wherein the first retarder circuit comprises a cooler for operably dissipating energy from the hydraulic system.

18. The vehicle of claim 14, wherein the first retarder circuit comprise at least one pressure limiting valve or at least one load orifice.

19. A composite vehicle, comprising:
a vehicle comprising:
- a frame;
- a plurality of wheels for supporting the frame;
- a drive for propelling the vehicle;
- a hydraulic system including a hydraulic pump for supplying at least one sub-assembly of the vehicle with hydraulic pressure, wherein the hydraulic pump is operatively connected to the drive;
- a first brake system for reducing a speed of the vehicle by at least one friction brake;
- a permanent brake system configured to reduce the speed of the vehicle, the permanent brake system comprising a first retarder circuit which cooperates with the hydraulic pump such that kinetic energy is removed from the vehicle by the permanent brake system via the hydraulic pump in order to decelerate the vehicle; and
- a second retarder circuit; and a trailer device comprising a brake system, wherein the second retarder circuit operably applies brake pressure to the brake system of the trailer device when the permanent brake system is activated.

20. The vehicle of claim 14, further comprising a system separation valve provided between the second retarder circuit and the brake system of the trailer device.

\* \* \* \* \*